United States Patent [19]

Fujise

[11] Patent Number: 5,426,692
[45] Date of Patent: Jun. 20, 1995

[54] COMMUNICATION TERMINAL AND THE METHOD USING THE SAME

[75] Inventor: Shunichi Fujise, Kawasaki, Japan

[73] Assignee: Canon Kabushiki Kaisha, Tokyo, Japan

[21] Appl. No.: 87,553

[22] Filed: Jul. 8, 1993

Related U.S. Application Data

[63] Continuation of Ser. No. 720,246, Jun. 24, 1991, abandoned.

[30] Foreign Application Priority Data

Jun. 27, 1990 [JP] Japan .................................. 2-166766

[51] Int. Cl.6 .......................................... H04M 11/00
[52] U.S. Cl. ...................................... 379/93; 379/94; 379/100
[58] Field of Search .............. 379/94, 97, 100, 96, 379/98, 93, 418, 373, 386, 388, 387, 92, 377

[56] References Cited

U.S. PATENT DOCUMENTS

| | | | |
|---|---|---|---|
| 4,718,057 | 1/1988 | Venkitakvishnan et al. | 370/85.1 |
| 4,821,312 | 4/1989 | Horton et al. | 379/102 |
| 4,922,484 | 5/1990 | Yoshida et al. | 370/68.1 |
| 4,961,185 | 10/1990 | Sawada | 379/100 |
| 5,067,125 | 11/1991 | Tsuchida | 370/79 |
| 5,113,396 | 5/1992 | Kagami | 379/100 |
| 5,113,432 | 5/1992 | Van Santbrink et al. | 379/100 |
| 5,187,736 | 2/1993 | Moriizumi | 379/100 |

OTHER PUBLICATIONS

"Study on Subscriber Line Circuits Applicable for Analogue Telephone and ISDN Interfaces", IEEE International Conference on Communications, BOSTONICC/89, S. Fujii et al. 1989, pp. 1413–1417.

Primary Examiner—Curtis Kuntz
Assistant Examiner—Stella L. Woo
Attorney, Agent, or Firm—Fitzpatrick, Cella, Harper & Scinto

[57] ABSTRACT

A communication terminal having an interface to which its components including an analog telephone are connected and which enables communication with another terminal at the other end of a line of the integrated services digital network. A first tone is generated to set the period of time for dialing of the analog telephone, a second tone different from the first tone is generated to set the period of time for connection between the analog telephone and the terminal at the other according to the dialing during the period of time when the first tone is being generated, and a third tone different from the first and second tones is generated to set the period of time for terminating communication using the analog telephone when the connection established during the period of time when the second tone is being generated is cancelled. Each of first, second and third tones generated is output to the analog telephone.

14 Claims, 7 Drawing Sheets

COMMUNICATION TERMINAL AND THE METHOD USING THE SAME

This application is a continuation, of application Ser. No. 07/720,246 filed Jun. 24, 1991, which is now abandoned.

BACKGROUND OF THE INVENTION

1. Field of the Invention

This invention relates to a communication terminal such as a facsimile apparatus having a plurality of data transmission functions and to the method description of the related art.

A basic user network interface provided for conventional communication terminals of this kind and connected to a line of the integrated services digital network (ISDN) is capable of connecting, at its maximum capacity, eight units including digital telephone sets and data communication terminals such as facsimile apparatuses. On the other hand, composite terminals in which a digital telephone set, a facsimile and the like are combined can be designed so as to have eight data transmission functions at the maximum and be connected to one basic user network interface.

In the conventional communication terminals, however, analog telephone sets cannot be used by being directly connected to the interface to the ISDN line. If an analog telephone set is connected in parallel with a G (group) 4 facsimile apparatus or the like through an adaptor, it cannot be used easily in practice because there is no means for informing the user of the states of the analog telephone and the line.

SUMMARY OF THE INVENTION

An object of the present invention is to provide a communication terminal free from these drawbacks of the conventional terminal.

Another object of the present invention is to provide a communication terminal which enables the user to know the state of the line.

Still another object of the present invention is to provide a communication terminal which enables the user to immediately judge whether or not an analog telephone can be used according to the kind of tone that he hears from the handset of the analog telephone or a speaker of the terminal.

A further object of the present invention is to provide a communication terminal having an interface to which its components including an analog telephone are connected and which enables communication with another terminal at the other end of a line of the integrated services digital network, the communication terminal comprising a first setting means for generating a first tone and setting the period of time for dialing of the analog telephone; a second setting means for generating a second tone different from the first tone and setting the period of time for connection between the analog telephone and the terminal at the other end of the line according to the dialing during the period of time set by the first setting means; a third setting means for generating a third tone different from the first and second tones and setting the period of time for terminating communication using the analog telephone when the connection established during the period of time set by the setting means is cancelled; and a tone output means for outputting each of the first, second and third tones generated.

A still further object of the present invention is to provide a communication terminal to which its components including an analog telephone are connected and which enables communication with another terminal at the other end of a line of the integrated services digital network, the communication terminal also having a speaker, the communication terminal comprising a first setting means for generating a first tone and setting the period of time for dialing of the analog telephone, a second setting means for generating a second tone different from the first tone and setting the period of time for connection between the analog telephone and the terminal at the other end of the line according to the dialing during the period of time set by the first setting means, a third setting means for generating a third tone different from the first and second tones and setting the period of time for terminating communication using the analog telephone when the connection established during the period of time set by the setting means is cancelled, and an output means for outputting each of the generated first, second and third tones through one of a plurality of output ends.

A still further object of the present invention is to provide a communication terminal having an interface to which its components including an analog telephone are connected and which enables communication with another terminal at the other end of a line of the integrated services digital network, the communication terminal comprising a detector means for detecting interruption of communication made by the terminal at the other end of the line during communication between the analog telephone and the terminal at the other end; a generator means for generating a predetermined tone when communication interruption is detected by the detection means; an output means for outputting the predetermined tone generated; and a termination means for stopping the supply of the predetermined tone output from the output means in accordance with a communication termination procedure for the analog telephone.

A still further object of the present invention is to provide a communication method which uses an interface to which components a communication terminal including an analog telephone are connected and which enables communication with another terminal at the other end of a line of the integrated services digital network, the method comprising the steps of generating a first tone and setting the period of time for dialing of the analog telephone; generating a second tone different from the first tone and setting the period of time for connection between the analog telephone and the terminal at the other end of the line according to the dialing during the period of time set by the first setting means; and generating a third tone different from the first and second tones and setting the period of time for terminating communication using the analog telephone when the connection established during the period of time set by the setting means is cancelled.

The above and other objects and features of the present invention will become apparent from the following description based on the accompanying drawings and from the appended claims.

DESCRIPTION OF THE PREFERRED EMBODIMENTS

Preferred embodiments of the present invention will be described below with reference to the accompanying drawings.

<First Embodiment>

Figure 1:
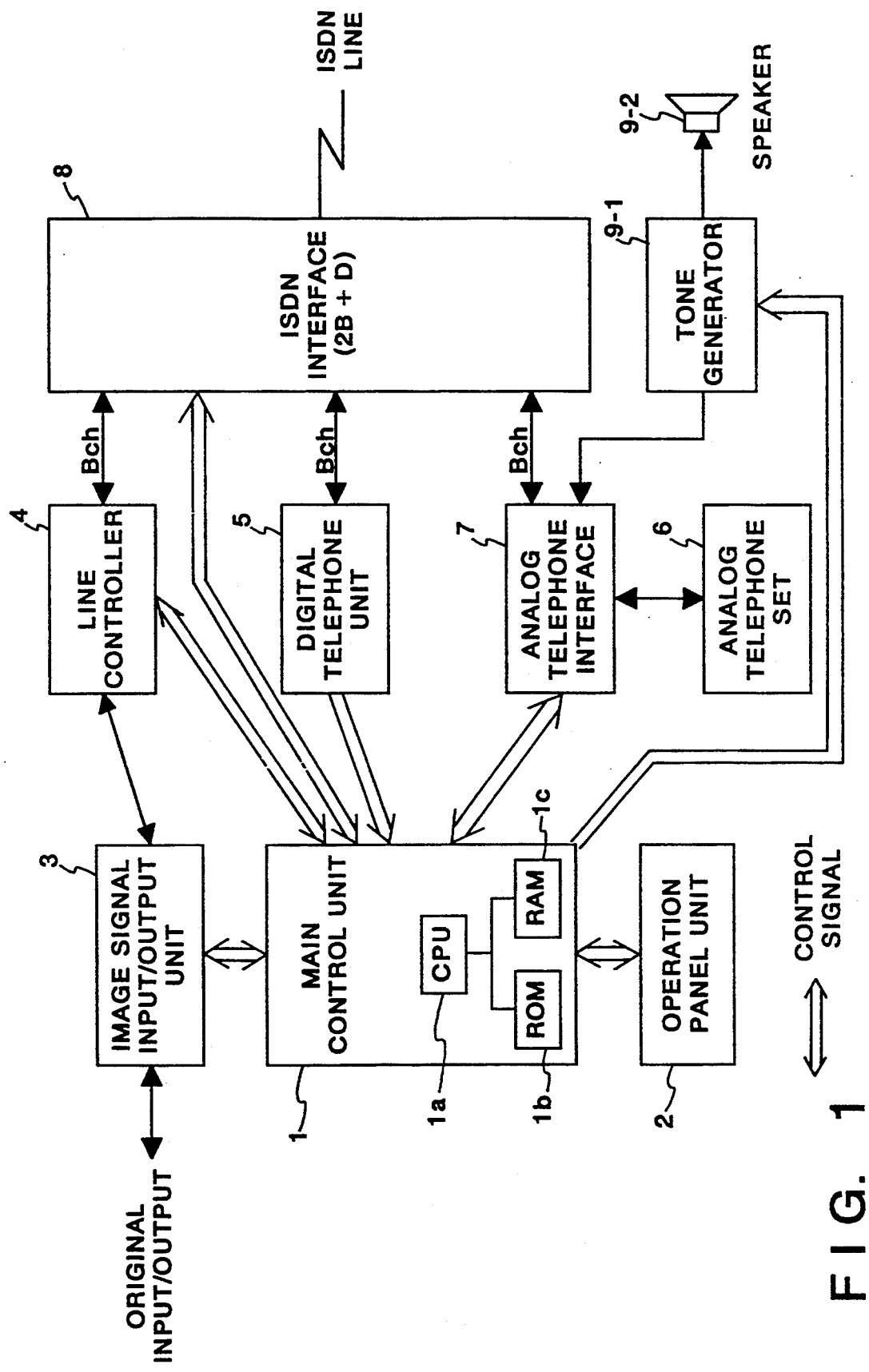
FIG. 1 is a block diagram of a communication terminal in accordance with a first embodiment of the present invention.

FIG. 1 is a block diagram of a communication terminal in accordance with a first embodiment of the present invention.

Figure 3A:
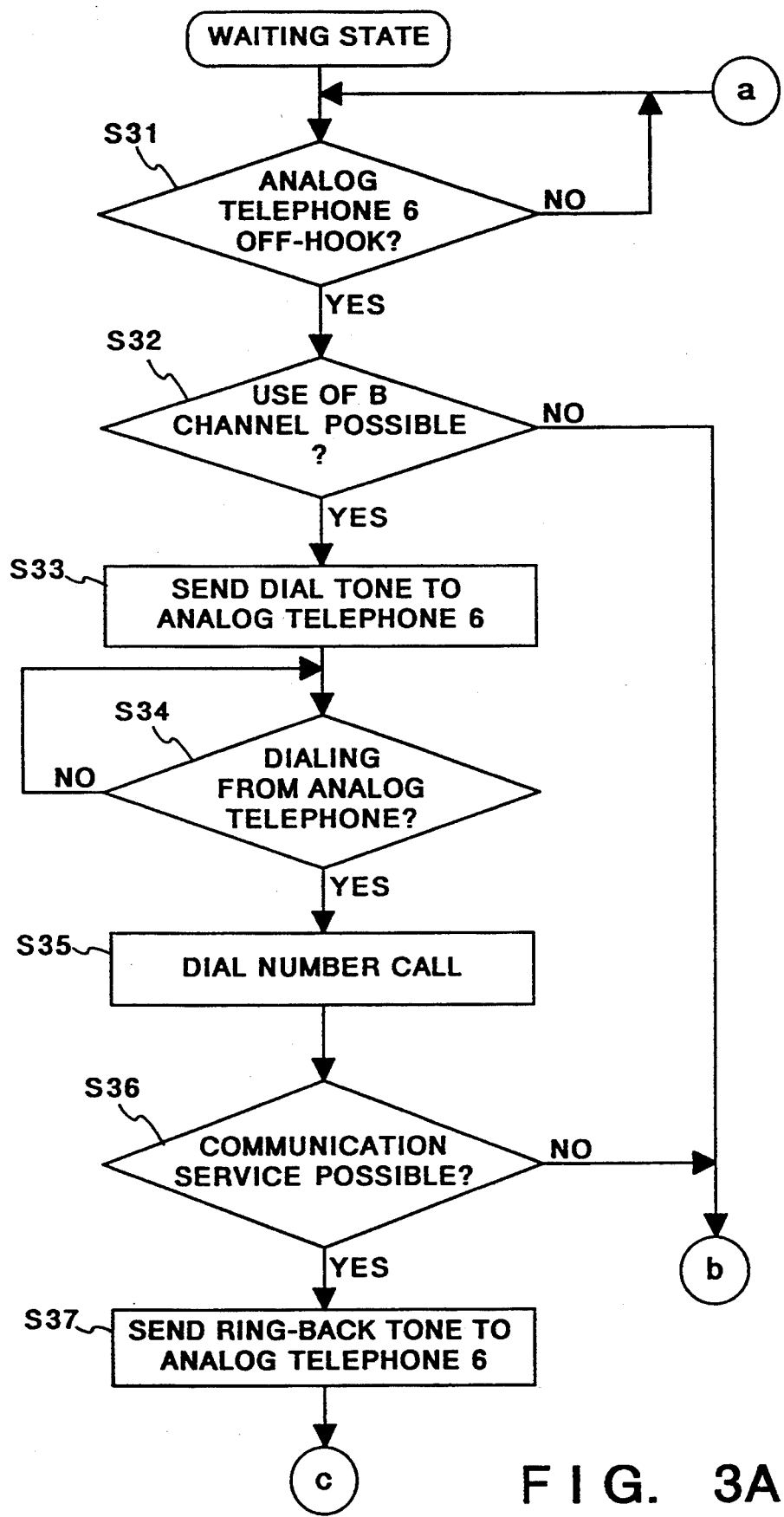
FIGS. 3A and 3B are diagrams of a flow chart showing the CPU-controlled communication operation of the first embodiment.
Figure 3B:
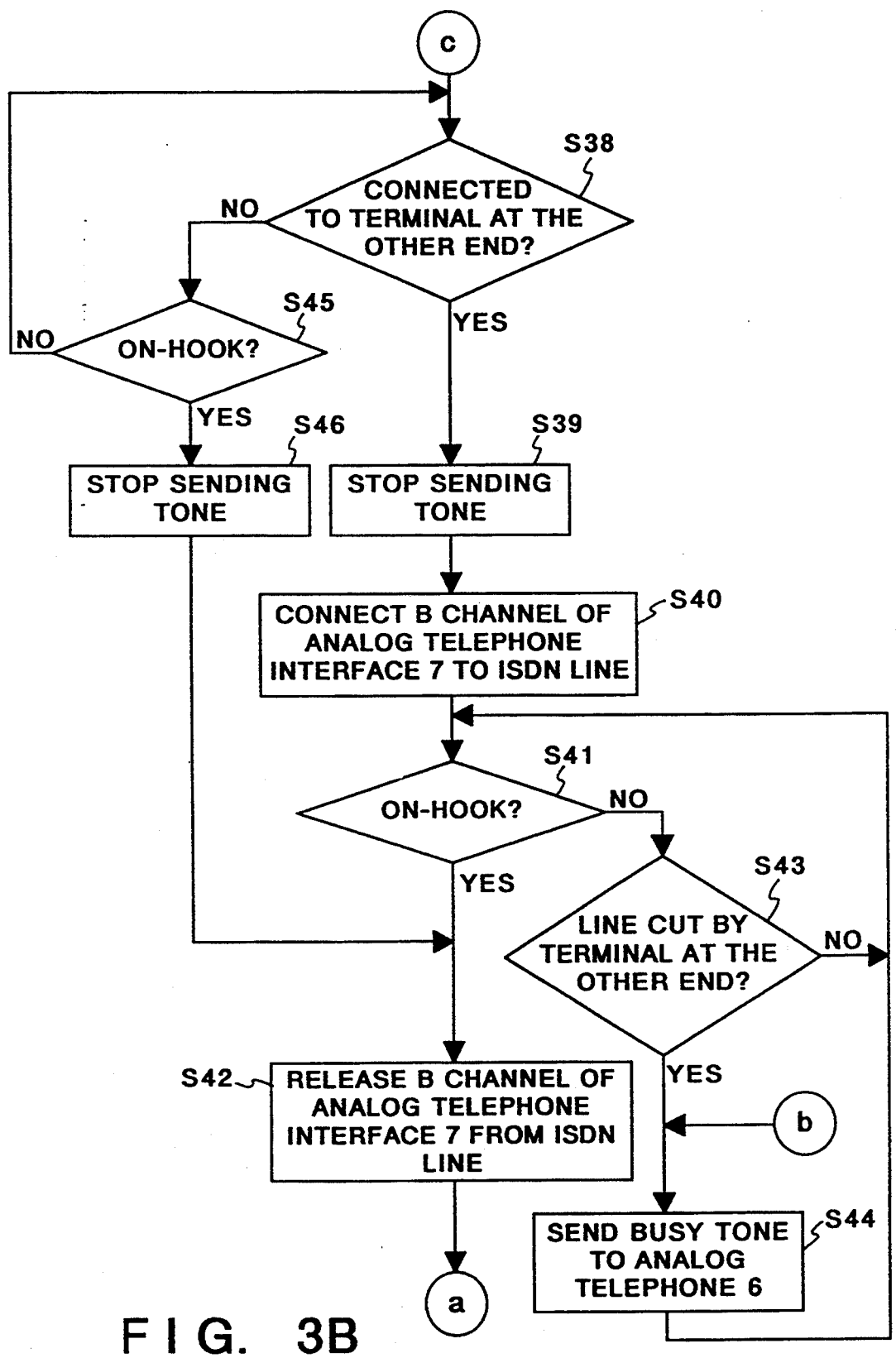

The communication terminal shown in FIG. 1 has a main control unit 1 including a CPU 1a for conducting operations for controlling the terminal, a ROM 1b in which a later-described program in accordance with the flow chart shown in FIGS. 3A and 3B is stored, and an auxiliary storage RAM 1c used as a work area. An operation panel unit 2 has keys necessary for communication functions, which keys are operated by the operator to input instructions. An image signal input/output unit 3 serves to input/output image signals at the time of facsimile transmission and is constituted by a scanner, a printer and other components. A line controller 4 conducts G3 mode communication control or G4 mode communication control and controls transmission/reception of a communication procedure or protocol and transmission/reception of image signals between the image signal input/output unit 3 and one of B channels of an ISDN interface 8.

A digital telephone unit 5 having a digital telephone function for exchange of PCM (pulse code modulation) codes of a voice signal between an attached handset and the B channel of the ISDN interface 8. An analog telephone interface 7 has a two-line connector to which an analog telephone 6 can be connected, and has a function of supplying DC power to the analog telephone 5, a function of converting the two lines into four lines for transmission path and a reception path, a function of encoding the analog signal on the four-line transmission path into PCM codes and sending the same to the B channel of the ISDN interface 8, a function of transmitting through the four-line reception path an analog signal decoded from PCM codes of a transmission signal obtained through the B channel of the ISDN interface 8 from the terminal at the other end of the line, a function of detecting the state of a hook switch of the analog telephone 6, and a function of detecting a digital dial value (dial pulse or push button signal) sent from the analog telephone 6. The ISDN interface 8 conducts D channel control and connects the B channel to at most two of the line controller 4, the digital telephone 5 and the analog telephone interface 7. A tone generator circuit 9-1 generates a necessary tone and supplies a suitable tone to the analog telephone 6 through the analog telephone interface 7. In the first embodiment, it generates an analog signal tone supplied to the four-line reception path of the analog telephone interface 7.

Figure 2:
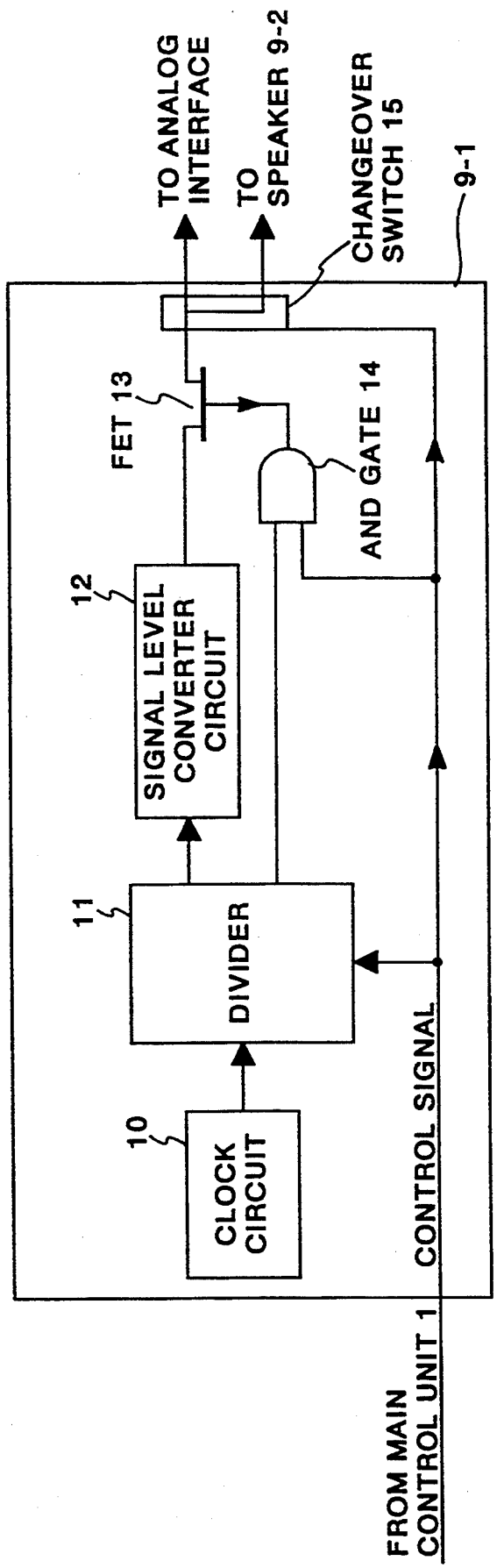
FIG. 2 is a block diagram of the tone generator circuit shown in FIG. 1.

FIG. 2 is a block diagram of the construction of the tone generator circuit 9-1 shown in FIG. 1. The tone generator circuit 9-1 has a clock circuit for generating a clock, and a divider 11 for dividing the frequency of the clock generated by the clock circuit 10 into a predetermined frequency and outputting the same. The output frequency can be controlled by the main control unit 1. A signal level converter circuit 12 converts the level of the clock signal output from the divider 11 into a predetermined level to be input into the analog telephone interface 7 or a speaker 9-2. A field effect transistor 13 and an AND gate serve to generate a call tone (ring-back tone). A changeover switch 15 serves to selectively supply the generated tone to one of the analog telephone interface 7 or the speaker 9-2. The speaker 9-2 outputs the call tone.

The operation of the first embodiment will be described below.

Figure 4:
FIG. 4 is a diagram of an example of the waveform of a dial tone used in the first embodiment.
Figure 5:
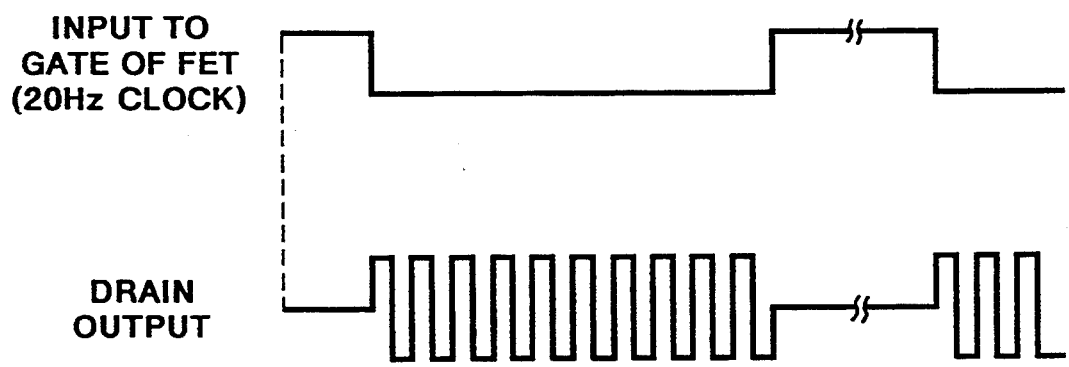
FIG. 5 is a diagram of the waveform of a ring-back tone used in the first embodiment.

FIGS. 3A and 3B show a flow chart of the communication operation conducted by the CPU 1a of the first embodiment, FIG. 4 is a diagram of an example of the waveform of the dial tone used in the first embodiment, and FIG. 5 is a diagram of a waveform of the ring-back tone used in the first embodiment.

In step S31 of the flow chart of FIGS. 3A and 3B, if the user takes up the receiver of the analog telephone 6, that is, the analog telephone 6 is unhooked during the waiting state, the analog telephone interface 7 detects the off-hook state of the analog telephone 6 and supplies DC power to the analog telephone 6. In step S32, the main control unit 1 determines whether or not the analog interface 7 can use one of B channels. That is, if at least one of the two B channels of the ISDN basic interface is not being used, the analog interface 7 can use it, or if both the B channels are used by the digital telephone unit 5 and the line controller 4 connected to the image signal input/output unit 3, the analog interface 7 can use none of them. If it is determined in step S32 that the analog interface 7 can use one of the B channels, the tone generator 9-1 is controlled so that the dial tone is supplied to the receiver of the analog telephone 6. That is, the divider 11 divides the clock generated by the clock circuit 10 to output a clock of 400 Hz. Also, the signal output from the signal level converter circuit 12 is directly supplied to the analog telephone interface 7, and the main control unit 12 outputs a signal "O" to the AND gate 14. Thus, a 400 Hz continuous signal such as that shown in FIG. 4 is output as the dial tone through the receiver of the analog telephone 6. The user hears this dial tone through the receiver of the analog telephone 6 to be informed that he can input a telephone number by operating the dial of the analog telephone 6.

In step S34, when the dial of the analog telephone 6 is operated to send a selection signal, the analog telephone interface 7 detects the digital value thereof. The dial signal generated by this dialing may be dial pulses or a PB signal. In step S35, the analog telephone interface 7 transmits the digital value to the main control unit 1, and the main control unit controls the ISDN interface 8 to call through the D channel. In step S36, determination is made from a control signal received from the ISDN line through the ISDN interface 8 as to whether or not service for communication with the terminal at the other end of the line is possible. If YES, the main control unit 1 controls the tone generator 9-1 to send the call tone (ring-back tone) to the receiver of the analog telephone 6. That is, the divider 11 is supplied with a 400 Hz clock and outputs the same to the signal level converter circuit 12.

On the other hand, the divider 11 outputs a 20 Hz clock to the AND gate 14. The 400 Hz and 20 Hz clocks are synchronized signals. When the main control unit 1 outputs a signal "1" to the AND gate 14 in this manner, a tone such as that shown in FIG. 5 consisting of waves of 400 Hz intermittently supplied at 20 Hz is generated. This tone is sent for one second out of three seconds. During the other two seconds, the supply of the tone is stopped by controlling the divider 11. The ring-back tone is thus output through the receiver of the analog telephone 6. The user hears this ring-back tone through the receiver of the analog telephone 6 to be informed that the terminal at the other end of the line is being called.

If in step S38 the connected state of the ISDN interface 8 and the terminal at the other end is detected, sending the ring-back tone is stopped in step S39, and in step S40 the ISDN interface 8 is controlled so that the B channel of the analog telephone interface 7 is connected to the ISDN line through the ISDN interface 8, thereby enabling communication between the analog telephone 6 and the terminal at the other end. In step S41, if the receiver is put down (hooked) after the completion of telephone communication, the analog telephone interface 7 detects this operation and stops the supply of DC power to the analog telephone interface 6. In step S42, the B channel of the analog telephone interface 7 is released from the ISDN line, and the ISDN interface 8 disconnects the line and the process returns to the waiting state.

If in step S32 the analog telephone interface 7 cannot use any B channel, if in step S36 the line to the terminal to be called is busy, or if in step 41 the receiver is not hooked on this side after the communication and in step S43 it is determined that the line is disconnected by the terminal at the other end of the line, the tone generator 9-1 is controlled in step S44 so as to send a busy tone to the receiver of the analog telephone 6. That is, the divider 11 outputs a 400 Hz clock and the main control section 1 outputs a signal "0" to the AND gate 14, thereby forming a 400 Hz continuous tone such as that shown in FIG. 5. The main control unit 1 controls the clock divider 11 to send this 400 Hz continuous tone for one second out of two seconds while supplying no tone during the other two seconds. The busy tone is thus output through the receiver of the analog telephone 6. The user hears this busy tone through the receiver of the analog telephone 6 to be informed that communication service is impossible because of, e.g., a busy state of the line to the other terminal. Then, if in step S41 the receiver is put down (hooked), the process returns to the waiting state by the same flow as that described above.

If in step S38 the line is not connected because of, for example, absence at the user of the other end terminal, and if the receiver is hooked in step S45, the supply of the ring-back tone to the analog telephone 6 is stopped in step S46, and the process returns to the waiting state by the same flow as that described above.

The above-described process makes it possible for the user to immediately judge whether or not the analog telephone can be used according to the kind of tone heard through the handset of the analog telephone.

<Second Embodiment>

Figure 6A:
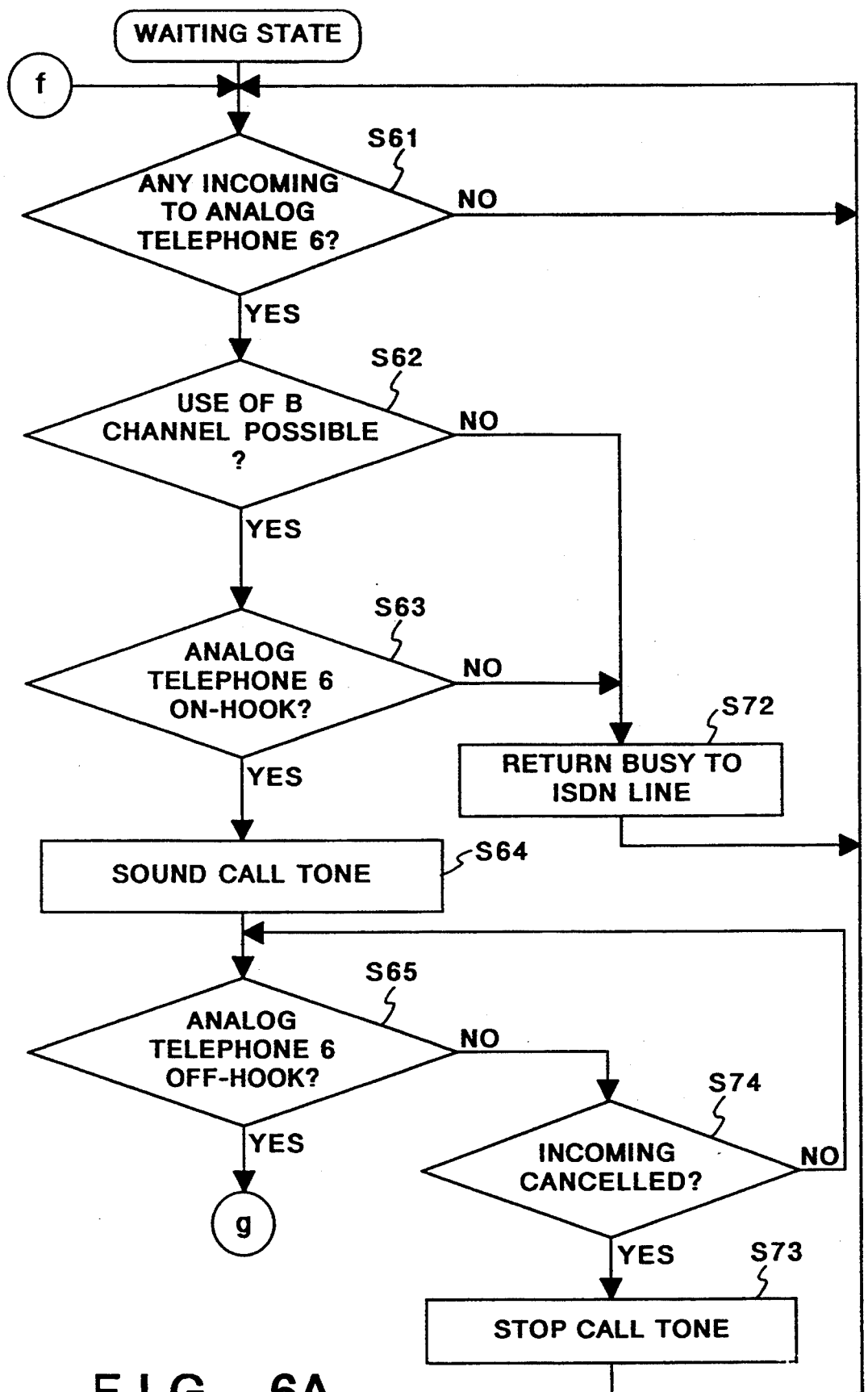
FIGS. 6A and 6B are diagrams of a flow chart showing the communication operation of the main control unit 1 in accordance with the second embodiment of the present invention.
Figure 6B:
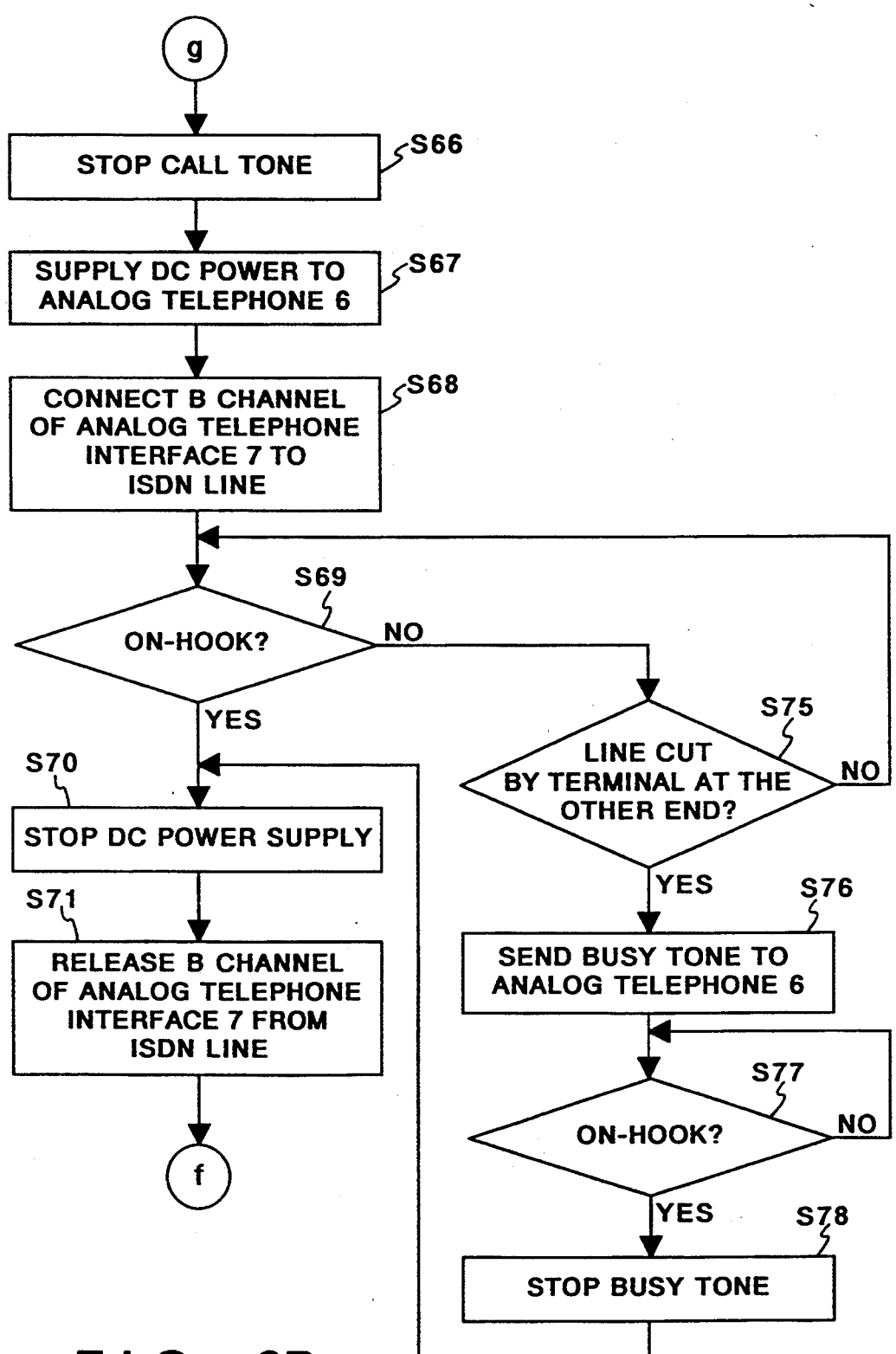

FIGS. 6A and 6B show a flow chart of the communication operation of the main control unit 1 in accordance with the second embodiment of the present invention. The components of the second embodiment are the same as those of the first embodiment shown in FIG. 1 and indicated by the same reference characters, and the description for them will not be repeated.

The operation of this embodiment will be described below in detail with reference to FIGS. 6A and 6B.

First, if in step S61 an incoming to the analog telephone 6 through the ISDN line is detected during the waiting state, it is determined in step S62 as to whether or not the analog interface 7 can use one of B channels. That is, if at least one of the two B channels of the ISDN basic interface is not being used, the analog interface 7 can use it, or if both the B channels are used by the digital telephone unit 5 and the line controller 4 connected to the image signal input/output unit 3, the analog interface 7 can use none of them. If in step S62 it is determined that the analog interface 7 can use one of the B channels, it is determined in step S63 as to whether or not the analog telephone is in the on-hook state. In the case of on-hook, the call tone is sounded in step S64. That is, as described above with respect to step S37 of the flow chart shown in FIGS. 3A and 3B, the call tone (ring-back tone) is generated and the changeover switch 15 of the tone generator 9-1 is controlled to output the call tone through the speaker 9-2. The user hears the call tone through the speaker 9-2 to be informed that there is an incoming call to the analog telephone 6. The call tone can be discriminated from block incoming to the other B channel by controlling the divider 11 to change the frequency and the send-out time.

If in step S65 the analog telephone 6 is unhooked, the sounding of the call tone is stopped in step S66, the analog telephone interface 7 supplies DC power to the analog telephone 6 in step S67, and, the B channel is connected to the ISDN line in step S68, thereby enabling communication between the analog telephone 6 and the terminal at the other end.

In step S69, if the receiver is put down (hooked), the analog telephone interface 7 detects this operation and, in step S70, stops supplying DC power to the analog telephone 6. In step S70, the channel B of the analog telephone interface 7 is released, the line is disconnected by the ISDN interface 8, and the process returns to the waiting state.

If in step S62 the analog telephone interface 7 cannot use any B channel, or if in step S63 the analog telephone 6 is in the off-hook state, the ISDN interface 8 sends back the busy signal to the ISDN line and disconnects the line and the process returns to the waiting state.

If in step S65 the analog telephone 6 is not unhooked and if the calling from the terminal at the other end is stopped, the sounding of the call tone is stopped in step S73 and the process returns to the waiting state.

If in step S69 the receiver is not hooked after the completion of communication, and if in step S75 the ISDN interface 8 senses that the terminal at the other end has disconnected the line, the tone generator 9-1 is controlled in step S76 so as to send the busy tone to the receiver of the analog telephone 6. This operation is the same as that of step S44 of the flow chart shown in FIGS. 3A and 3B and will not be described again. The user hears the busy tone through the receiver to be informed that the line to the calling terminal is disconnected. If in step S77 the analog telephone 6 is hooked, the busy tone is stopped in step S78, the supply of DC power to the analog telephone 6 is stopped in step S70, and the channel B of the analog telephone interface 7 is released while the ISDN interface 8 disconnects the line in step S71. The process then returns to the waiting state.

Thus, the call tone is generated according to a call from the ISDN line and the state of the terminal, thereby enabling the user to immediately confirm that there is an incoming call to the analog telephone and that communication is possible. Thus, it is possible to effectively use the ISDN line to which terminals are generally connected parallel to each other.

In the above-described first and second embodiments, the tone generator 9-1 is constituted by a clock circuit 12 and other circuits arranged to generate tones. However, the tone generating means of the invention is not limited to this, and the tone generator 9-1 may be constituted by a divider alone and tones are generated in a simulative manner. Alternatively, the arrangement may be such that the tone generator 9-1 is constituted by a ROM having PCM codes encoded from desired tones, a counter and a parallel/serial converter, and PCM codes read from the ROM are decoded and converted into an analog signal to be output to the analog telephone 6 or the speaker 9-2.

Further, the analog telephone interface 7 may have a function of directly sounding the call tone of the analog telephone 6.

In accordance with the present invention, as described above, the user can immediately judge whether or not the analog telephone can be used according to the kind of tone that he hears from the head from the handset of the analog telephone or the speaker of the terminal.

The present invention is not limited to the above embodiments and various changes and modifications can be made within the spirit and scope of the present invention. Therefore, to apprise the public of the scope of the present invention the following claims are made.

What is claimed is:

1. A communication terminal comprising:
   tone generating means for generating a ring-back tone;
   speaker means for outputting the ring-back tone generated by said tone generating means;
   first detecting means for detecting an incoming call from a network;
   control means for controlling said tone generating means to generate the ring-back tone for said speaker means in accordance with a detection by said first detecting means;
   a digital telephone unit for performing communication of voice data; and
   image communication means for performing communication of image data,
   wherein said control means controls image communication control of said image communication means and voice communication control of said digital telephone unit.

2. A communication terminal according to claim 1, wherein said control means sets frequency data to said tone generating means, and said tone generating means generates a tone in accordance with the set frequency data.

3. A communication terminal comprising:
   tone generating means for generating a ring-back tone and a busy tone;
   speaker means for outputting the ring-back tone generated by said tone generating means;
   first detecting means for detecting an incoming call from a network;
   second detecting means for detecting interruption of communication made by the terminal at the other end of the line during communication with the terminal at the other end; and
   control means for controlling said tone generating means to generate the ring-back tone for said speaker means in accordance with a detection by said first detecting means, and for controlling said tone generating means to generate the busy tone in accordance with a detection by said second detecting means.

4. A communication terminal according to claim 3, further comprising third detecting means for detecting whether or not said communication terminal is in an on-hook state,
   wherein said control means controls generation of a tone by said tone generating means in accordance with a detection by said third detecting means.

5. A communication terminal according to claim 3, further comprising a digital telephone unit and image communication means for performing communication of image data,
   wherein said control means controls image communication control and speaking of said digital telephone unit.

6. A communication terminal according to claim 3, wherein said control means sets frequency data to said tone generating means, and said tone generating means generates a tone in accordance with the set frequency data.

7. A communication terminal having an interface connected to a digital communication line and another interface connected to an analog telephone apparatus, comprising:
   detection means for detecting that a remote party, who is in communication with the analog telephone apparatus through the digital communication line has disconnected the digital communication line; and
   transmission means for transmitting a predetermined tone to the analog telephone apparatus when the disconnection has been detected by said detection means.

8. The terminal according to claim 7, wherein the predetermined tone is a busy tone.

9. The terminal according to claim 7, wherein the digital communication line is an ISDN (Integrated Services Digital Network).

10. The terminal according to claim 7, further comprising communication means for performing image-communication through the digital communication line.

11. A method for controlling a communication terminal having an interface connected to a digital communication line and another interface connected to an analog telephone apparatus, comprising the steps of:
    determining whether a remote party, who is in communication with the analog telephone apparatus through the digital communication line, has disconnected the digital communication line; and
    transmitting a predetermined tone to the analog telephone apparatus when it is determined that the digital communication line has been disconnected.

12. The method according to claim 11, wherein the predetermined tone is a busy tone.

13. The method according to claim 11, wherein the digital communication line is an Integrated Services Digital Network line.

14. The method according to claim 11, further comprising a communication step for performing image-communication through the digital communication line.

* * * * *

UNITED STATES PATENT AND TRADEMARK OFFICE
CERTIFICATE OF CORRECTION

PATENT NO. : 5,426,692
DATED : June 20, 1995
INVENTOR(S) : SHUNICHI FUJISE

It is certified that error appears in the above-identified patent and that said Letters Patent is hereby corrected as shown below:

ON TITLE PAGE

In [56] References Cited, under U.S. PATENT DOCUMENTS:
"Venkitakvishman et al." should read
--Venkitakrishnan et al.--.

COLUMN 2

Line 44, "components" should read --components of--.

COLUMN 5

Line 59, "of" should read --at--.

COLUMN 8

Line 37, "line" should read --line,--.

Signed and Sealed this

Twelfth Day of December, 1995

Attest:

BRUCE LEHMAN

*Attesting Officer*   *Commissioner of Patents and Trademarks*